United States Patent [19]

Rahrig

[11] Patent Number: 4,536,360
[45] Date of Patent: Aug. 20, 1985

[54] GLASS FIBER REINFORCED VINYL CHLORIDE POLYMER PRODUCTS AND PROCESS FOR THEIR PREPARATION

[75] Inventor: Douglas B. Rahrig, Brunswick, Ohio

[73] Assignee: The B. F. Goodrich Company, Akron, Ohio

[21] Appl. No.: 630,421

[22] Filed: Jul. 13, 1984

[51] Int. Cl.$^3$ .............................. C08K 9/00; C08K 9/06
[52] U.S. Cl. .................................... 264/142; 428/251; 428/288; 428/290; 428/391; 428/392; 523/209; 523/212; 523/213
[58] Field of Search ....................... 523/209, 212, 213; 428/251, 288, 290, 391, 392; 264/118, 142

[56] References Cited

U.S. PATENT DOCUMENTS

| | | | |
|---|---|---|---|
| 3,493,461 | 2/1970 | Sterman | 428/251 |
| 3,928,684 | 12/1975 | Buning et al. | 523/209 |
| 4,282,283 | 8/1981 | George et al. | 428/292 |
| 4,289,672 | 9/1981 | Friederich et al. | 524/591 |
| 4,340,520 | 7/1982 | Marsden et al. | 523/209 |
| 4,358,501 | 11/1982 | Temple | 428/290 |
| 4,358,502 | 11/1982 | Dunbar | 523/213 |
| 4,370,157 | 1/1983 | Barch et al. | 523/209 |
| 4,390,647 | 6/1983 | Girgis | 102/272 |
| 4,413,085 | 11/1983 | Temple | 524/300 |
| 4,426,469 | 1/1984 | Marzola et al. | 523/209 |

*Primary Examiner*—Herbert J. Lilling
*Attorney, Agent, or Firm*—James R. Lindsay; Alfred D. Lobo

[57] ABSTRACT

Vinyl chloride (VC) resins, particularly poly(vinyl chloride) (PVC) and chlorinated poly(vinyl chloride) (CPVC) are reinforced with glass fibers which have been sized with a particular aminosilane coupling agent and an alkylene oxide-containing film former. This combination of sizing components, among all others, generates allylic Cl atoms in the VC chain of the polymer. Though the VC resin contains an adequate amount of stabilizer to counter the formation of such allylic Cl atoms in the mass of the resin, enough are generated near the surface of the glass to cause a reaction with the aminosilane so as to bond the glass fibers to the VC resin so strongly that a composite only fails in coherent failure. The sizing consists essentially of (i) an aminosilane coupling agent having a reactive amine moiety which upon reaction with the VC resin results in a compound having a peak in a proton magnetic resonance spectra at 5.65 ppm, and (ii) a film former consisting essentially of a polymer having a ring-opened lower alkylene oxide containing from about 2 to about 4 carbon atoms as an essential component in a repeating unit optionally containing another copolymerizable component. The wet strength of the composite is about equal to or greater than the dry strength of an identical composite which has no film former in the sizing.

18 Claims, 5 Drawing Figures

GLASS FIBER REINFORCED VINYL CHLORIDE POLYMER PRODUCTS AND PROCESS FOR THEIR PREPARATION

BACKGROUND OF THE INVENTION

This invention is related to the reinforcing of vinyl chloride homopolymers ("VC homopolymers" for brevity) with glass fibers in the field of improving the physical strength characteristics of organic synthetic resinous materials. More particularly, this invention is related to thermoplastic glass fiber reinforced ("GFR") poly(vinyl chloride) ("PVC") homopolymer, and chlorinated poly(vinyl chloride) ("CPVC") which are either individually or together referred to herein as "VC homopolymer" and commonly available as rigid PVC and CPVC.

Currently there are available numerous GFR thermoplastic materials including polyolefins, polyacetals, polyamides (nylons), polycarbonates, polystyrenes, styrene-acrylonitrile copolymers, acrylonitrile-butadiene-styrene (ABS) copolymers, and most recently, PVC. These GFR polymers are used in various forms, chief amongst which are generally spherical or ellipsoidal molding pellets having an equivalent diameter in the range from about 3 mm to about 8 mm, used to feed a thermoforming machine. By "thermoforming" I refer to the transformation of thermoplastic resin into a useful shape by means of heat and/or pressure. Illustrative thermoforming processes are molding by injection of hot resin into a mold, extrusion, pultrusion, hot calendering, casting, vacuum forming and the like. Chopped glass fibers less than about 6.4 mm long are fed to the machines in which the vigorous mixing and high shear flow patterns cause further comminution often reducing the length 10–100 times, so that the principal function of the fibers is to stiffen rather than strengthen a composite (see *Encyclopedia of Chemical Technology* by Kirk & Othmer, pg 973, Vol 13 Third Ed., John Wiley & Sons, 1981). This invention is concerned with strengthening GFR PVC and CPVC composites, not only with respect to their dry strength but also to their wet strength.

Since the largest volume general purpose thermoplastic resin commercially today produced in the world is PVC, and has been for many years during which others of the aforementioned resins have been successfully exploited after they have been reinforced with glass fibers, it would appear anachronistic that the propitious appearance of GFR PVC in the market place should have suffered such an unseemly delay. To a lesser extent this is also true of CPVC which has been used extensively for the extrusion of pipe to carry hot fluids under pressure, especially corrosive liquids; and, for the injection molding of a variety of plumbing fittings, housings for pumps and the like.

Faced with the task of providing a commercially acceptable GFR VC resin one soon reconciles the delay in the debut of the resin in the market place. One finds that PVC lacks thermal stability and, when reinforced with even a relatively low level of glass fiber content, say about 10 percent by weight (% by wt) based on the combined weight of resin and glass, acquires a disconcertingly high viscosity which makes it difficult to fill the corners of even a relatively small mold.

To combat the lack of thermal stability, numerous stabilizers have been incorporated into the VC resins. To reduce the viscosity numerous solutions have been proffered, most logical of which has been the hunting and choosing of various likely copolymers which might compatibly be blended with the VC resin. For example, U.S. Pat. Nos. 2,572,798; 2,773,851; and 3,883,473 disclose blending PVC with a coumarone-indene resin. A conventional process for incorporating glass fibers into various resins is disclosed in U.S. Pat. No. 3,164,563.

Stabilizers in VC molding resins are particularly adapted to combat their dehydrochlorination which is accelerated above the glass transition temperature ("$T_g$") of the resin, and is particularly severe above the melting point. This dehydrochlorination of VC resins is well-recognized in the art to give rise to a double bond adjacent to a Cl atom in the VC chain (see the chapter titled "Thermal Degradation and Stabilization" in the text *Polymer Stabilization* by W. Lincoln Hawkins, pg 126 et seq., Wiley Interscience 1972). This Cl is referred to as an "allylic Cl" and it is generally regarded as being instrumental in the degradation of VC resins. The generation of allylic Cl atoms and concomitant degradation occurs throughout the mass of resin being thermoformed, and not surprisingly, to counteract the degradation, the stabilizer is desirably distributed throughout the mass to negate the propagation of allylic Cl atoms in each chain. Understanding the foregoing mechanism has led to the search for more effective stabilizers which negate propagation more quickly, and for lower processing temperatures.

In view of the known proclivity of GFR VC homopolymer to degrade at elevated temperatures due to the propagation of allylic Cl atoms, it is especially noteworthy that it is these generally undesirable allylic Cl atoms which have now been recognized to be essential to provide a unique reaction between the primary amine group (referred to as a reactive amine moiety) of an aminosilane coupling agent and the VC homopolymer chain. It is this reaction which inculcates unexpected strength in a thermoformed VC homopolymer which is reinforced with glass fibers specifically "sized" to provide the necessary reaction.

Thus, the invention is more generally directed to copolymers of VC with a copolymerizable monomer in which copolymers VC is present in an amount sufficient to generate an allylic Cl atom under thermoforming conditions. The copolymers may be postchlorinated provided there are sufficient runs of 10 or more C atoms in VC chains to generate reactive allylic Cl atoms. Such copolymers of VC, optionally postchlorinated, and VC homopolymer are generically referred to herein as "VC resins".

By a "run of C atoms" we refer to a portion of the polymer chain which is characteristically a PVC chain, that is, having about 57% Cl in the run. As the Cl content of the run increases, as it will when a VC copolymer or homopolymer is chlorinated ('postchlorinated'), the difficulty of generating a reactive allylic Cl atom increases. The presence of runs in a polymer may be identified by nuclear magnetic resonance (NMR) spectra as is taught in U.S. Pat. Nos. 4,350,798 and 4,377,459 to Richard G. Parker the disclosures of which are incorporated by reference thereto as if fully set forth herein.

By the term "sized" or "sizing" I refer to glass fibers, whether in strands, rovings, tow or yarns, which are treated specifically for use in a GFR thermoplastic resin. Unsized glass fibers are also referred to as untreated, 'pristine', or 'bare' glass fibers. For use as reinforcing, glass fibers are provided with a "size" which in this invention is the combination of a coupling agent or 'finish' and a 'film former' without regard to the physical form in which they are combined on the surface of the fibers.

The 'finish' or 'coupling agent' is typically particularly chosen by the manufacturer of the fibers with particular regard for the specific resin in which the fibers are to be used. Numerous finishes are used, the organosilanes being preferred for general use. Examples of silanes are found in U.S. Pat. Nos. 2,563,288; 2,563,889; 3,318,757; 3,493,461 and many others. Additional finishes are listed in a publication titled "The Influence of Reinforcements on Strength and Performance of Fiber Glass Reinforced Thermoplastics" by J. T. Inglehart et al, given at the 22nd meeting of Reinforced Plastics Division of the Society of Plastic Industry, Inc.

Some GFR composites in which the glass fibers are coated with a coupling agent only, display remarkably improved strength. However, the notion that simply providing a proper coupling agent will maintain the original dry strength of a composite after it is submerged in water for a month, is unfounded and harsh reality belies it.

Of course, persons skilled in the art are well aware that the choice of finish and film former (bonding interlayer) are two of a multiplicity of variables which influence the strength and performance of GFR resins. It is also generally recognized that even with the optimum choice of finish and film former for reinforcing a particular resin, along with the type of glass and the length and diameter of the glass fibers used, one can have too little finish and/or film former; or, too much of either, or too much of both. However, it is immediately apparent tha there are so many choices of combinations of variables to be explored that even extensive not-so-simple trial and error, such as one skilled in the art is enured to, will be a most unlikely method of finding an optimum combination of variables. The task is greatly simplified if one divines the essential physical/chemical mechanism which might lead the way to discovery of the optimum combination of variables.

With this logical approach to providing a better solution to the problem of making a satisfactory if not superior GFR composite with a VC resin, U.S. Pat. No. 3,493,461 teaches that the key variable is choice of the organosilane. A vast array of silanes and hydrolyzates thereof are taught to provide GFR VC composites as long as the silane-treated glass fibers and PVC resins are brought in intimate contact with each other in any convenient manner, and then thermoformed. Buried in the disclosure of a very large number of silanes, and their hydrolyzates deemed to be equally or comparably effective, is the teaching of an aminoalkyltrialkoxysilane (in grouping (c) in col 2) which includes numerous compounds lacking a primary amine reactive moiety. Since the vast majority of the silanes disclosed do not have the essential primary amine reactive moiety which catalyzes generation of the desired allylic Cl atoms, these silanes are incapable of adequately catalyzing the formation of an allylic Cl; and, of course, it will be recognized that the hydrolyzates of these silanes are also incapable of doing so.

Some references, such as U.S. Pat. No. 3,644,271 teach that the key lies in heating and masticating a mixture of a powdered PVC in a specified particle size, in combination with pelletized PVC in the correct size; and, a specified amount of each PVC by weight relative to the weight of glass fibers used; and, that all the other variables are much less important. It even suggests that "The difficulties of obtaining a good bond between the thermoplastic material and the glass fibers has been substantially overcome by the development of suitable treating agents for the glass fibers."

In many prior art references, it is averred that the key lies in providing the correct film former, namely a vinyl chloride-vinyl trialkoxysilane copolymer, and whether the glass fibers are finished or bare does not play an important part in determining the degree of the additional reinforcing effect of the bonding layer (see, e.g. U.S. Pat. No. 3,928,684 col 4, lines 46–53).

No reference has recognized the criticality of generating the allylic Cl atoms in a zone adjacent the surface of the glass fibers where they can react with the primary amine moiety of the coupling agent. Of course, at extrusion temperatures, varying amounts of allylic Cl atoms may be generated solely due to thermal initiation, but these are generated throughout the mass of the hot resin and are immediately negated by the stabilizer present, hence are of little value near the surface of the glass fibers where they are needed. It is the recognition of this phenomenon which provided the impetus to find a coupling agent which had the unique propensity for catalyzing the formation of an allylic Cl in a zone adjacently surrounding the glass fibers.

However, it was found that not only was the generation of allylic Cl atoms by the presence of the aminosilane inadequate, but also the wet strength of a GFR VC resin, either with no film former, or with an arbitrarily chosen film former, was unacceptably so low as to have no commercial significance. By "wet strength" we specifically refer to the strength of a GFR VC resin composite which has been submerged in 50° C. water for at least 900 hr. Thus, it was necessary to bolster both the catalytic action of the aminosilane, and also the wet strength of the GFR VC composite.

It was determined that the selection of the particular components of the sizing was the key to providing the necessary catalytic action and also the wet strength. The identification of these two essential components of the "sizing" for the glass fibers, along with providing the requisite amount of heat to help the generation of the allylic Cl atoms, and controlling the amounts of the finish and film former present on the fibers, pointed the way to the discovery of a composition which is as unobvious as it is uniquely tailored; of a process for forming pellets of the composition adapted for injection molding the composition; and, of shaped articles produced from the composition.

SUMMARY OF THE INVENTION

It has been discovered that the effective reinforcement of solvent-free VC resins with glass fibers is predicated upon the use of a specific type of "sizing" consisting essentially of an aminosilane coupling agent having a reactive amine moiety in combination with a particular type of alkylene oxide-containing film former, which together have the peculiar property of catalyzing the generation of allylic Cl atoms in the VC resin chain, and improving not only the dry strength, but particularly also the wet strength of a GFR VC resin composite.

It is therefore a general object of this invention to provide a glass fiber reinforced (GFR) VC resin in which the glass fibers are sized with the combination of (i) an amino silane coupling agent having a reactive amine moiety which upon reaction with the resin results in a compound having a peak in a proton magnetic resonance spectra at 5.65 ppm, and, (ii) a film former consisting essentially of a polymer having a ring-opened lower alkylene oxide containing from about 2 to about 4 carbon atoms as an essential component in a repeating unit optionally containing another copolymerizable component; and, the resin is stabilized with a conventional stabilizer for thermoforming the resin.

It is a specific object of this invention to provide a GFR VC resin stabilized with a metallo-organic salt or soap or an organometallic compound having a carbon-to-metal bond, in which the glass fibers are sized with an amino silane coupling agent represented by the formula

wherein, $R^1$ represents an alkylene group having from 2 to about 5 carbon atoms,
n represents an integer in the range from 0 to 3, and $R^2$ represents alkyl having from 1 to about 6 carbon atoms; and,
a film former represented by the formula

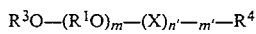

wherein,
X is the residue of a monomer selected from the group consisting of epichlorohydrin, tetrahydrofuran, beta-propiolactone, styrene oxide, maleic anhydride, and an alkylene glycol having from 1 to about 12 carbon atoms;
$R^3$ and $R^4$ independently represent a member selected from the group consisting of hydrogen and a hydrocarbon having from 3 to about 30 carbon atoms;
n' is an integer in the range from 0 to about 100;
m is an average number of recurring units which is in the range from about 5 to about 200,000;
m' is an average number of recurring units which is in the range from 1 to about 5,000;
n' is less than m;
and $R^1$ and X are present in relative heterogeneous order.

It is another specific object of this invention to provide a GFR VC homopolymer which is stabilized with an organometallic stabilizer and in which glass fibers less than 1 mm long are "sized" with from 0.1 to about 1% by wt, based on the wt of glass, of an amino silane with a primary reactive amine moiety in combination with from about 0.1% to about 1% by wt, based on the wt of glass, of a water-soluble film former containing an alkylene oxide repeating unit, whereby upon thermoforming the GFR VC homopolymer the glass fibers are bonded to the homopolymer so strongly that a thermoformed composite fails in cohesive failure. By "cohesive failure" we refer to to failure of a sample of GFR VC resin due to tearing of resin from resin, rather than tearing of resin from the glass surface ("adhesive failure"). Thus, cohesive failure is predicated upon the resin's properties rather than the bond between resin and glass.

It is still another specific object of this invention to provide pellets of the foregoing GFR VC homopolymer which may be thermoformed into a shaped article which is characterized by excellent dry strength, and also excellent wet strength after 900 hr (hours) of exposure to 50° C. water; which fails in cohesive failure; and, which has a tensile wet strength about equal to or better than the dry strength of an identical composite with no film former.

Further specific objects of the invention including a process for pelletizing GFR VC resin, and particularly VC homopolymer; thermoforming the pelletized material, particularly injection molding it; thermoformed composites formed from the GFR VC resins; and, pultruded shaped articles formed from continuous glass fiber, or from mat each of which has been particularly sized as specified herein, are described in detail hereinafter.

BRIEF DESCRIPTION OF THE DRAWINGS

The foregoing and other objects and advantages of my invention will appear more fully from the following description, made in connection with the accompanying photomicrographs of a preferred embodiment of the invention, along with those of prior art embodiments for ease of comparison and to provide demonstrative evidence of the unique characteristics of the claimed invention.

DETAILED DESCRIPTION OF PREFERRED EMBODIMENTS

Figure 1:
FIG. 1 is a photomicrograph at 1200× magnification of a cross section of a composite of GRF PVC in which the glass fibers are treated with a silane coupling agent only, and no film former, the cross section being of a fractured tensile dumbbell.

In producing glass fiber strands, a multiplicity of glass fibers are drawn at high speed from molten cones of glass at the tips of small orifices in a bushing in a glass batch melting furnace. While the fibers are being drawn and before they are gathered into a strand or strands, they are treated with an aqueous sizing composition. The sizing composition must protect the glass fibers from interfilament abrasion and allow the glass fibers to be compatible with the materials they are to reinforce. For the purpose of this description, the aqueous sizing composition consists essentially of a film former to give the strand integrity and workability, and a coupling agent. Routinely, a lubricant and an antistatic agent are added, optionally with still other adjuvants to prepare the strands for their end use, but the choice of these adjuvants forms no part of the invention.

Sized glass in the form of one or more strands, both continuous and chopped, and in the form of mat and roving (plural strands in one group), are essential for reinforcing polymers. Chopped glass strands and chopped glass fiber roving are especially useful in the preparation of GFR polymers in the form of sheet molding compound, bulk molding compound, and thick molding compound. Sized glass is typically sold by the manufacturer for a specific application for use with a particular polymer, and the sizing is chosen for the particular polymer. No glass fiber is currently available with a sizing specifically chosen to reinforce VC resins.

It is preferred to use fibrous glass filaments comprising lime-aluminum borosilicate glass which is relatively soda-free, "E" and "S" glass being most preferred. However, other glasses may be used, for example low soda glasses such as "C" glass, it being found that optimum strengths are not obtained with high soda glasses. The filaments are made by known processes in a diameter less than 20 microns, and preferably about 10 to about 16 microns, though neither the type of glass nor the diameter of the filaments is narrowly critical in the practice of this invention.

The length of the glass filaments and whether they are bundled into fibers and the fibers bundled in turn into yarns, ropes or rovings, or woven into mats, and the like, are also not critical to the invention. However in preparing the present compositions it is convenient to use the filamentous glass in the form of chopped strands of from about 1 mm to about 27 mm long, preferably less than 5 mm long. In the composition most preferably used for producing pellets in the size range from about 3 mm to about 8 mm in equivalent diameter, which pellets are used for molding shaped articles, even shorter glass fiber lengths, generally less than 1 mm will be encountered because, during compounding, considerable fragmentation will occur, some fibers being as short as 100 microns.

The best properties of the thermoformed composites are obtained when the glass fibers are present in an amount in the range from about 5% to about 50% by weight, based on the wt of combined glass fibers and resin; and, the fibers are in the range from about 500 microns to about 1 mm long. It will be appreciated that less than 5% glass fibers in a composite has little reinforcing value to be of commercial significance; and, more than about an equal part by wt of glass fibers, relative to the amount of VC resin, results in a mixture which cannot be satisfactorily processed.

The glass fibers should be coated with (i) from about 0.1 to about 1% by wt (i.e. 0.1 to 1 part by wt per 100 parts by wt of pristine glass fibers), more preferably from 0.2 to 0.6% by wt, of the aminosilane represented by the formula (I); and (ii) from about 0.1 to about 1% by wt, more preferably from 0.2 to about 0.6% by wt of a film former represented by the formula (II). Since the length of the glass fibers in the composition is relatively short, the increase in strength of the reinforced thermoformed composite is dependent upon the amount of the sizing coated on the fibers provided the amount is in the ranges given.

The PVC useful in the present invention is the homopolymer of vinyl chloride obtained by either the mass or suspension polymerization techniques, in the form of porous solid macrogranules. Macrogranules of PVC which are converted to CPVC will typically have an average diameter in excess of 20 microns, with a preponderance of particles in excess of 50 microns in diameter. The morphology of PVC and CPVC macrogranules, specifically the porosity and surface area, are important properties which determine the physical properties of the polymer. Since CPVC is generally derived by the chlorination of PVC, also referred to as 'post-chlorination', it has been found that the properties of product CPVC may be tailored to a large extent by precisely controlling the conditions under which precursor PVC is polymerized. Processes for the production of CPVC are disclosed in U.S. Pat. Nos. 2,996,489; 3,506,637; 3,534,103; and 4,412,898; pertinent portions of the disclosures of each of which are incorporated by reference as if fully set forth herein.

Most preferred as a starting material is a suspension polymerized PVC having a porosity in the range from about 0.22 to about 0.35 cc/g, a surface area in the range from about 0.6 m$^2$/g to about 3 m$^2$/g, and an inherent viscosity in the range from about 0.53 to about 1.2, that is, having a relatively high molecular weight. The molecular weight of PVC may be related to its inherent viscosity which is determined as taught in the '898patent. The most commonly used PVC resins have an inherent viscosity in the range from about 0.53 to about 1.1, or slightly higher, and are referred to as "rigid PVC".

Most preferred are Geon ® 110×346 PVC, and Geon ® 623 and 625 CPVC resins commercially available from The B. F. Goodrich Company.

The aminosilane is generally liquid and, because the amount to be deposited on the fibers is relatively small, unhydrolyzed aminosilane is applied to the fibers from a solution, usually in water, of preselected concentration. The details of the manner of applying the aminosilane are conventional, generally well known, and described in the art, for example in U.S. Pat. Nos. 4,410,645 and 4,254,010, and references cited therein, the relevant portions of which are incorporated by reference thereto as if fully set forth herein.

The aminosilane coupling agents having the foregoing formula (I) are commercially available for the specific purpose of sizing glass fibers. Some of the aminosilanes which in combination with the film former having the foregoing formula (II) are effective in producing the resulting GFR VC resin composites of this invention are as follows:

beta-aminomethyltrimethoxysilane
N-beta-aminoethyl-gamma-aminopropyltrimethoxysilane
N-beta-aminoethyl-gamma-aminopropyltriethoxysilane
gamma-aminopropyltrimethoxysilane
gamma-methylaminopropyltrimethoxysilane
gamma-ethylaminopropyltrimethoxysilane
gamma-aminopropyltriethoxysilane
gamma-aminopropyltripropoxysilane
gamma-aminopropylmethyldiethoxysilane
gamma-aminopropylethyldiethoxysilane
gamma-aminopropylphenyldiethoxysilane
gamma-aminoisobutyltrimethoxysilane
N-(2-aminoethyl)-N'-[3-(triethoxysilyl)propyl]-1,2-ethanediamine
N-(2-aminoethyl)-N'-[3-(trimethoxysilyl)propyl]-1,2-ethanediamine
delta-aminobutyltriethoxysilane
delta-aminobutylmethyldiethoxysilane, and
beta-aminoethyltriethoxysilane.

Though film formers which are copolymers having the formula (II) are effective, a convenient film former is a OH-terminated polyether in which the alkylene oxide in the chain is a lower alkylene oxide which is ring-opened, typically ethylene oxide, propylene oxide or butylene oxide. The $(R^1O)_m$ chain may be formed from the residue of a single alkylene oxide unit, or a copolymeric structure of the residues of different alkylene oxide units.

The average number of repeating units "m" is in the range from about 5 to about 200,000, and more preferably from about 100 to about 10,000. Since the sizing is applied to the glass from a solution, the film former is preferably one which is soluble in commonly available organic solvents (solvent-soluble), but it is most preferred that the polyether film former be water-soluble so that the glass may be sized using about a 2–30% aqueous solution in a conventional manner.

The group $R^3$ may be any one of several hydrocarbon groups such as are conventionally used for polyether type film formers, and include phenyl, substituted phenyl, and fatty acid groups. If desired, the polyether may be a copolymer of an alkylene oxide with another copolymerizable component, for example a polyol, particularly a lower alkylene diol such as propylene glycol, which copolymer maintains the desirable characteristics of the film former; and, as long as the number of ring-opened alkylene oxide units predominates in a chain, the film former will provide the desired catalytic action to help generate allylic Cl atoms near the glass surface. The copolymer (II) typically is a random copolymer which may contains runs of each repeating unit, but the order in which the residues of each comonomer are linked in the chain is not especially significant. Preferred copolymers (II) are those in which n' is less than 0.5 m.

Preferred alkylene oxide film formers are represented by the formula $$R^3—(R^1O)_m—R^4$$

wherein the symbols have the same connotation as before, and m is in the range from about 100 to about 10,000.

Some more preferred film forming polymers are as follows: poly(ethylene oxide), water-soluble polypropylene glycols, polyoxyethylene monooleyl ether, polyoxyethylene monostearyl ether, polyoxyethylene monolauryl ether, polyoxyethylene monononylphenyl ether, polyoxyethylene distearyl ether, polyoxyethylene dinonylphenyl ether and the like.

The GFR VC thermoplastic resin composition in the best mode of this invention consists essentially of 100 parts by wt of VC resin, and from 10% to about 35% by wt of glass fibers coated with from 0.2% to about 0.6% by wt of a specified aminosilane, and from 0.2% to about 0.6% by wt of a specified film former. If the amounts of each of the foregoing is substantially outside the specified ranges, the moldability and processability of the glass fibers and resin is reduced, and both the dry strength and wet strength are vitiated.

As used herein, the term "consisting essentially of" means that the named ingredients are essential, though other ingredients which do not vitiate the advantages of the invention can also be included. Such ingredients may include conventional additives such as fillers like talc, mica, clay and the like, light stabilizers, heat stabilizers, antioxidants, pigments and dyes as may be required for a particular purpose, it being recognized that the amount of the additive(s) used will affect the physical properties of the thermoformed composite.

PREPARATION OF COMPOSITES FOR TESTING

All the compounding ingredients except the chopped glass strands were 'powder-mixed' on a Henschel high speed mixer at 3000 rpm for 30 sec. Each powder mixture was then milled on a Getty Model 60 4"×9" electric mill at a mill roll temperature of 215° C. using a roll separation of about 0.025". Then 105 g of the powder is fed to the mill and fused in about 1 min after which 44 g of chopped glass fibers about 6.4 mm long which have been treated with an aminosilane and a film former were added to the VC hompolymer while milling is continued. The GFR sheets were taken off the mill and labeled to distinguish the mill direction from the transverse direction.

The milled sheets were constant volume molded into 6"×6"×0.05" plaques. In this procedure the mold was preheated to 199° C. for 10 min. Then 65 g of the GFR VC sheet were added to the mold. Care was taken to assure that all milled stock added to the mold was maintained at the same orientation. The mold was then placed into the press and over a 1 min time span, a pressure and release schedule of 5, 10, 20 and 30,000 lbf was followed. The pressure was then pumped to 30,000 lbf a second time and maintained for 1.5 min. The mold was then transferred tp a cold press and allowed to cool for 5 min under pressure. Tensile dumbbells were cut and routed from these plaques. Again care was taken to identify sample orientation relative to the mill direction during the operation of these tensile bars.

As will be evident from the data presented in Table I hereinbelow, a composite of stabilized PVC reinforced with bare glass (composite sample #1, the control) has a wet tensile strength slightly greater than one-half its dry tensile strength, the wet strength being measured after 900 hr of submersion in 50° C. water. When a sample #2 is prepared from glass without a film former, but is treated with a silane coupling agent which does not contain a reactive primary amino moiety, there is no substantial improvement over the bare glass (sample #1). A substantial improvement, nearly 50% greater than the control's strength is obtained when the glass (sample #3) is treated with an aminosilane coupling agent (I) only, and a comparable improvement in wet strength is obtained; but the improvement is of little commercial significance because the wet strength, in particular, is unacceptably low.

A composite of the same stabilized resin reinforced with glass (sample #4) treated with an aminosilane coupling agent (I) and a polyvinylacetate (PVA) film former has about the same strength (or a little less) as a composite made from glass (sample #3) with aminosilane (I) and no film former. Only glass treated with both the aminosilane (I) and a polyethylene oxide (PEO) film former (II) provides double the wet strength and nearly double the dry strength of the control. Most notably, the wet tensile strength of sample #5 is about equal to the dry tensile strength of sample #3.

In the Table all composites were prepared in exactly the same manner using 100 parts by wt Geon® 110×346 PVC, 44 parts by wt of glass, and 3 parts by wt of Thermolite 31 dibutyl tin bisisooctylthioglycolate stabilizer. The data are presented in Table I herebelow.

TABLE I

| PVC Composite with | *Dry strength (psi) | *Wet strength (psi) |
| --- | --- | --- |
| #1 Glass fibers-bare (control) | 10,400 | 6,000 |
| #2 Glass fibers w/ glycidoxypropylsilane[1] | 10,900 | 7,000 |
| #3 Glass fibers w/aminosilane[2], NO film former | 13,300 | 10,500 |
| #4 Glass w/aminosilane[2] + PVA film former | 13,000 | 6,000 |
| #5 Glass w/aminosilane[2] + PEO film former | 18,400 | 13,400 |

*measured at room temperature using an Instron testing machine
[1]gamma-glycidoxypropyltrimethoxysilane
[2]N—beta-aminoethyl-gamma-aminopropyltrimethoxysilane To determine wet strength the tensile bars were submerged in a constant temperature 50° C. water bath from which they were withdrawn at preselected intervals. Each was patted to surface dryness with a paper towel, then tested in the Instron. Each sample was tested within 1 hr from the moment it was removed from the water bath.

All tensile strength measurements were made at a jaw separation rate of 0.2"/min and at room temp.

Fracture surfaces of the tensile bars were examined by scanning electron microscopy (SEM). Element mapping for chlorine and silicon was done with the energy dispersive X-ray capability on the SEM, as is well known in the art, and more fully described in Kirk & Othmer, supra, Vol. 2, pg 634.

Fiber samples for fiber length measurements were extracted from the milled and pressed plaques by dissolving away the PVC with THF. The residual glass fibers were then collected on filter paper, heat cleaned in a muffle oven at 600° C. and finally measured.

Referring to FIG. 1 there is shown a SEM photomicrograph of a section of a tensile bar of composite #2 magnified 1200× in which the glass fibers are clean in the region near the breaks in the glass fibers. The fibers seem to be well bonded to the polymer matrix where the fibers protrude from the matrix. By 'clean' we refer to an absence of any coating (polymer), thus indicating adhesive failure.

Figure 2:
FIG. 2 is a photomicrograph at 1200× magnification of a cross section of a composite of GRF PVC in which the glass fibers are treated with an aminosilane coupling agent and a polyvinylacetate (PVA) film former, the cross section being of a fractured tensile dumbbell.

Referring to FIG. 2 there is shown a SEM photomicrograph of composite #4 in which the glass fibers have a coating of PVA which interferes with the coupling mechanism by preventing the PVC from coming into contact with the aminosilane to produce the desired improvement in tensile strength. Gaps are visible between the fibers and the matrix where the fibers extend through it. The generally lower strength than with no film former is deemed to arise from a "mixed-mode" behavior resulting in a reduced average interfacial strength in the composite, and greatly reduced wet strength due to the large fraction of fiber surface which remains hydroscopic due to residual PVA at the fiber-matrix interface.

Figure 3:
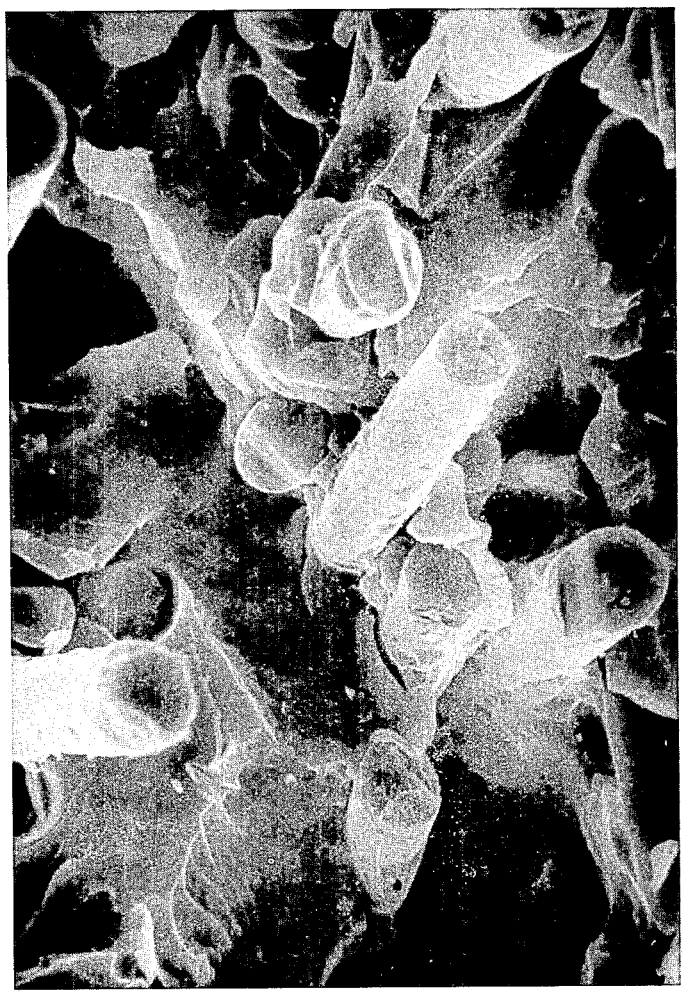
FIG. 3 is a photomicrograph at 1200× magnification of a cross section of a composite of GRF PVC in which the glass fibers are treated with an aminosilane coupling agent and a polyether polyol film former, the cross section being of a fractured tensile dumbbell.

Referring to FIG. 3 there is shown a photomicrograph at identical magnification of 1200× of composite #5 in which the broken glass fibers are coated with a layer of PVC polymer indicating cohesive failure. That the coating is PVC is established by analysis as described herebelow. Further, the fibers are seen to be tightly held in the matrix as evidenced by no visible gaps between the fibers and the matrix where the fibers extend through the matrix. The excellent strength of the composite, whether wet or dry, is attributed to a covalent bond which is hypothesized to exist between the reactive primary amine moiety of the aminosilane and the VC chain of the polymer.

Figure 4:
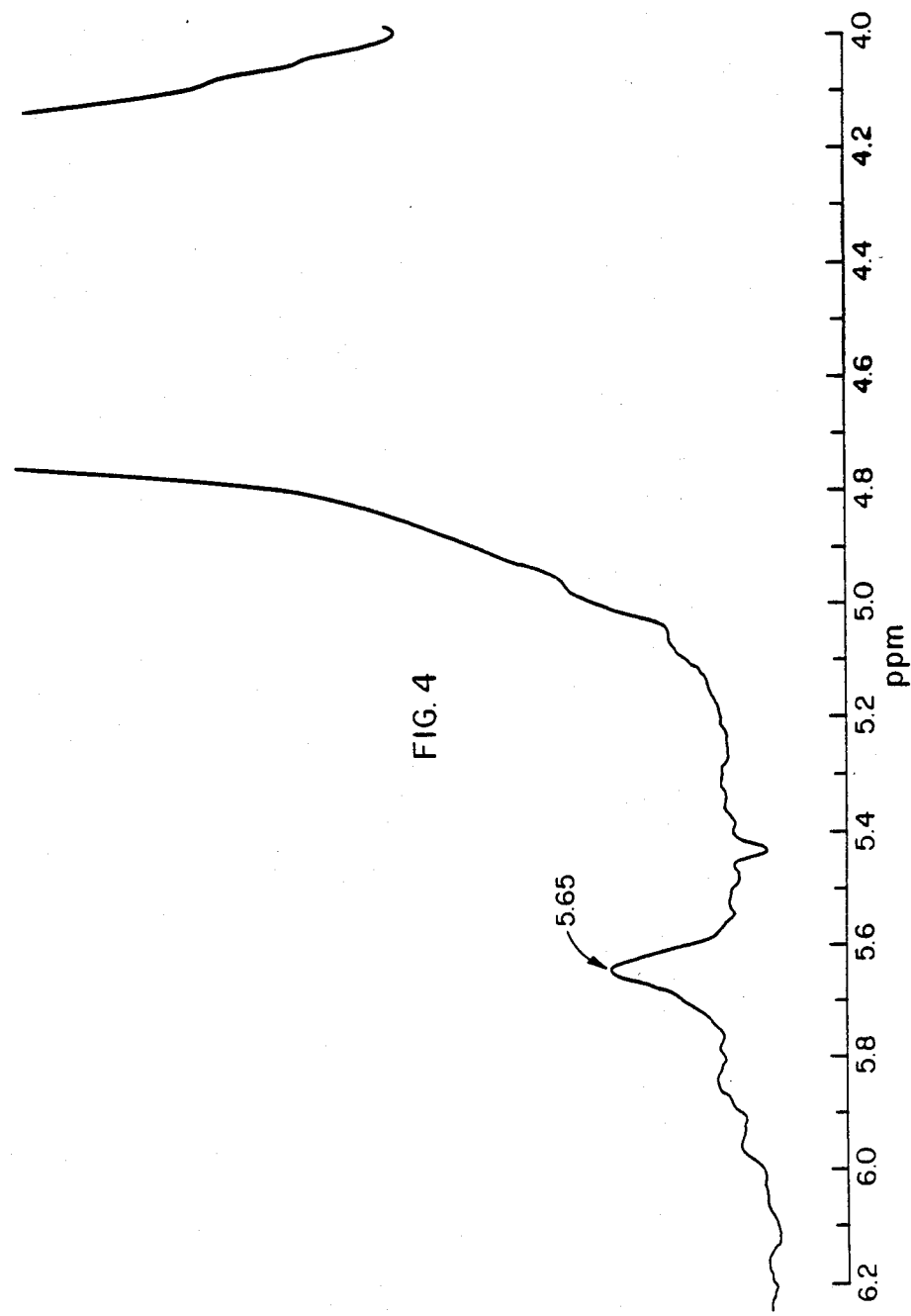
FIG. 4 is a trace of a proton magnetic resonance (pmr) spectra of a thermoformed GFR PVC composite of Geon ® 110×346 PVC in which the glass fibers are sized with an aminosilane having a reactive primary amine moiety.

Referring to FIG. 4, there is presented the essential pertinent portion of a proton magnetic resonance (pmr) spectra of a thermoformed PVC sample treated with aminosilane (I) but no film former to simplify reading of the spectra. The spectra is obtained in a conventional manner using the technique described more fully in "Branching and Unsaturated Structures and Radically Polymerized Poly(vinyl chlorides) Studied by High Resolution Proton Magnetic Resonance" by Roger Petiaud and Quand-Tho Than, *Makromol. Chem.* 178, 177 (1977), which is incorporated by reference thereto as if fully set forth herein. Evidence of a reaction between the amine group of the aminosilane (I) and the allylic Cl atom in the VC chain is provided by a peak at 5.65 ppm (delta scale). A shift of this peak which is typically present in milled (unreacted with a primary aminosilane) PVC at 5.85 ppm, a portion of which remains in the spectra, indicates the presence of a double bond in the PVC chain.

Figure 5:
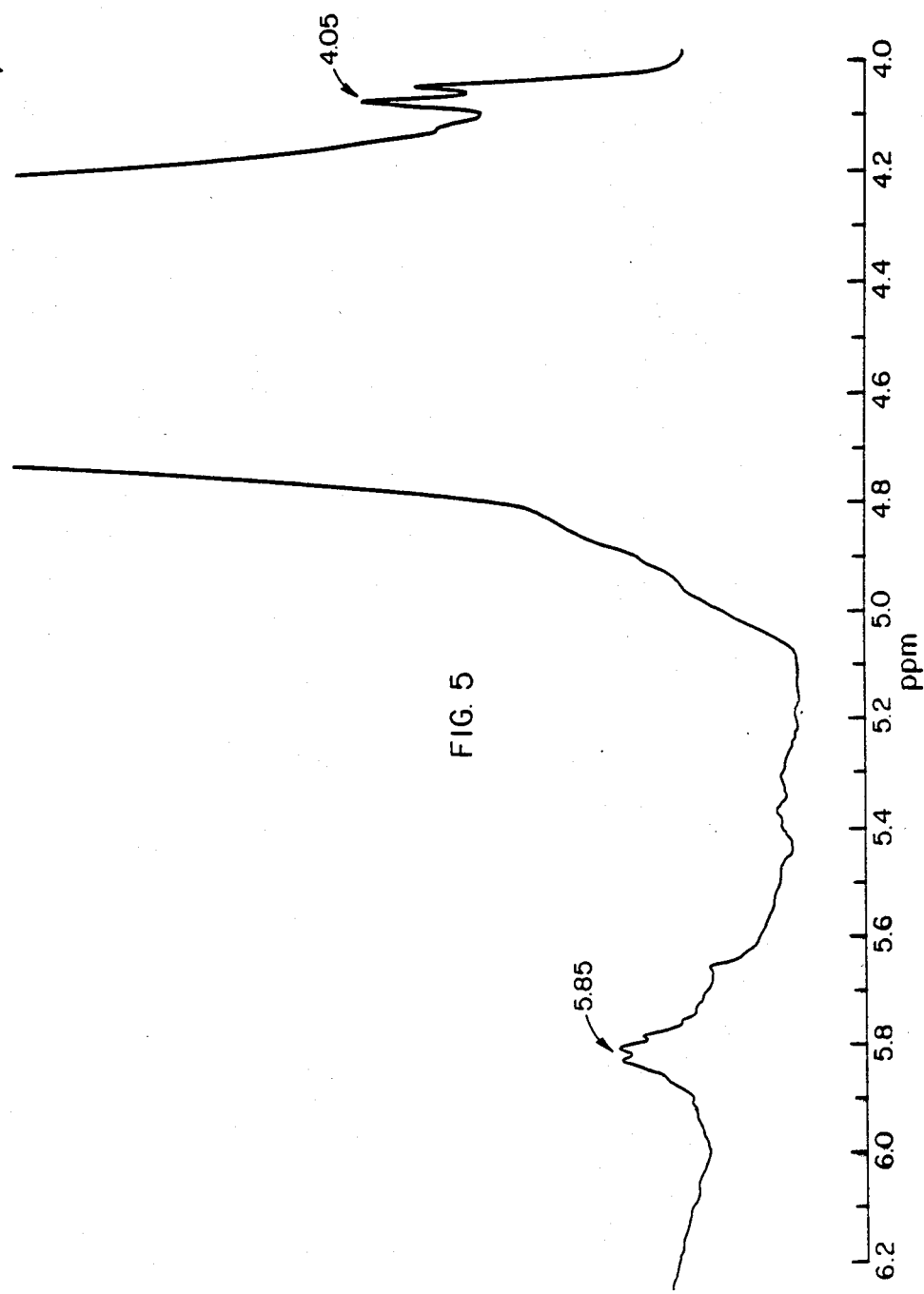
FIG. 5 is a trace of a pmr spectra, obtained in a manner analogous to that used to obtain the pmr shown in FIG. 4, of a conventionally milled Geon ® 110×346 PVC without any aminosilane in it.
*Geon is a Registered Trademark of The B. F. Goodrich Company

Referring to FIG. 5, there is shown a pmr spectra of a conventionally milled PVC (the same PVC used to make the composite for which the pmr spectra is shown in FIG. 4) which has been heated to fusion temperature, above 160° C. but below about 200° C. The spectra was obtained in a manner analogous to that in which the pmr shown in FIG. 4 was obtained, and as before, the essential comparable portion is shown. The peak at 5.85 ppm is clearly visible. Further, a doublet centered at 4.05 ppm which is typically present in milled unreacted (with aminosilane) PVC, disappears after formation of my GFR VC composite in which the aminosilane has reacted. The spectra of conventional PVC and the presence of the characteristic doublet is described in *Die Angewandte Makromolekulare Chemie* 83 (1979) 183-196 (Nr. 1318).

The identification of the polymer coating on the protruding fiber ends in the broken specimens is established by element maps of the failed composites. Chlorine is mapped at a magnification of 3000×, and silicon is mapped at 1500×. The element maps show that #5 is chlorine rich and the chlorine concentration is highest in those regions where polymer coating is visible in the SEM photomicrograph. Since the original film formers do not contain chlorine, the evidence is clear and convincing that the presence of Cl is attributable to that of PVC bonded to the fibers.

Other analyses may be used to confirm the foregoing reaction of the allylic Cl atom. For example, the relative intensities of peaks between $1500^{-1}$ cm and $1530^{-1}$ cm in the Raman spectra show that PVC treated with an aminosilane coupling agent having a reactive primary amine moiety, when thermoformed, has less conjugated unsaturation than an identical PVC similarly processed but in the absence of the aminosilane. This is evidence of reaction of the allylic Cl atom in the chain which one would expect to result in decreased conjugated unsaturation.

Preparation of pellets

Pelletizing the composition is most preferably done in a pelletizing extruder after the composition is masticated in a Buss Kneader into which Geon ® 110×346 PVC and other compounding ingredients are fed. The ingredients are preferably premixed in a Henschel mixer for several minutes to obtain a homogeneous fluidizable powder. The powder is dumped into a ribbon blender where it is held and agitated before being fed to the feeder of the Buss Kneader.

The Buss Kneader which has two heating zones is used as a 7 L/D compounder. The powder blend is added to the first port using an ET 46 Feeder at a 1.2 setting. Chopped glass fibers less than 2.5 cm long are added at the downstream port a distance 4 L/D from the first port. The glass fibers and powder mixture are kneaded through a length 3 L/D and then dropped to the pelletizing extruder which has its own heating zone.

The pelletizing extruder is a low compression 6 L/D pumping extrduer equipped with a strand die with hot face cutting knives. The glass fiber containing resin is exposed to a temperature in the range from about 160° to about 180° C. for a brief time in the pelletizer before it is extruded through the strand die and cut into uniform pellets which are air conveyed to a separator-receiver and air-cooled. The GFR PVC may reach a temperature of about 205° C. just prior to being extruded from the strand die. After the fines are blown out to a vacuum recovery system, the cooled pellets are bagged.

Extrusion of GFR PVC pellets

The pellets produced as described hereinabove are conventionally extruded using a 25 mm Haake single screw extruder in its 25 L/D operating mode with a 2/1 compression screw. The extruder is run at 20 rpm and developed head pressures in the range from about 1500–2000 psi. In the 25:1 mode there were five zones of temperature control for the barrel and one zone for the die. The barrel temperature zones were set from 150° C. to about 170° C. and the die temperature zone was set for 175° C.

The particular die used was a slit die $0.125'' \times 1.0''$ and the extrudate was carried from the extruder on a moving belt.

Pultrusion of GFR PVC rods

Longitudinally extending parallel strands of glass roving which has been sized as described hereinabove are passed separately through orifices into a cross-head die into which molten PVC is forced so as to impregnate the roving. The impregnated roving strands are then led into a die in which excess resin is removed and the strands are tightly held together in the shape of the rod desired, and gradually cooled.

Sheet molding of GFR PVC sheets

Sheets of GFR PVC are prepared by impregnating glass mat sized as described hereinabove with PVC so that there is about an equal weight of PVC and glass fiber in each sheet. Several such sheets cut to a predetermined configuration are stacked in a mold and conventionally molded at a temperature of 160°–200° C. and a pressure of about 1000 psi (about 30,000 lb force) to form a shaped article.

In a manner analogous to that described for each of the methods hereinabove, GFR CPVC composites may be prepared from pellets, or from molten CPVC which impregnates glass fibers sized with the aminosilane and film former described in this invention, to provide reproducibly and reliably, both excellent dry strength and wet strength.

I claim:

1. A thermoplastic composition of vinyl chloride resin and glass fibers particularly well-adapted to be thermoformed, comprising a mixture of,
   (a) from about 50 percent to about 95 percent by weight (% by wt) based on the combined weight of glass fibers and vinyl chloride resin, of a vinyl chloride resin in which the vinyl chloride portion of each repeating unit contains from about 57% to about 72% by wt of chlorine,
   (b) from about 5% to about 50% by wt of glass fibers having a diameter less than about 20 microns, wherein said glass fibers are coated with a size consisting essentially of
      (i) an amino silane coupling agent having a reactive amine moiety which upon reaction with said resin results in a compound having a peak in a proton magnetic resonance spectra at 5.65 ppm, and
      (ii) a film former consisting essentially of a polymer having a ring-opened lower alkylene oxide containing from about 1 to about 4 carbon atoms as an essential component in a repeating unit optionally containing another copolymerizable component, and,
   (c) a stabilizer for said homopolymer in an amount sufficient to provide desired stability of the composition during thermoforming.

2. The composition of claim 1 wherein it is particularly well-adapted to be fed directly to an injection-molding machine, and said vinyl chloride resin is present in an amount in the range from about 50% to about 95% by wt; and, said glass fibers are present in an amount in the range from about 5% to about 50% by wt based on the combined weight of glass fibers and vinyl chloride resin, and have a diameter in the range from about 10 microns to about 16 microns.

3. The composition of claim 2 wherein said amino silane coupling agent is represented by the formula $$H_2NR^1-(R^1NH)_n-Si(R^2O)_3$$

wherein,
R$^1$ represents an alkylene group having from 2 to about 5 carbon atoms,
n represents an integer in the range from 0 to 3, and
R$^2$ represents alkyl having from 1 to about 6 carbon atoms; and,
said film former is a solvent-soluble polymer represented by the formula $$R^3O-(R^1O)_m-(X)_{n'-m'}-R^4$$

wherein,
X is the residue of a monomer selected from the group consisting of epichlorohydrin, tetrahydrofuran, beta-propiolactone, styrene oxide and maleic anhydride, and an alkylene glycol having from 1 to about 12 carbon atoms;
R$^3$ and R$^4$ independently represent a hydrogen atom, or a hydrocarbon group having from 3 to 30 carbon atoms;
n' is an integer in the range from 0 to about 100;
m is an average number of recurring units which is in the range from about 5 to about 200,000;
m' is an average number of recurring units which is in the range from 1 to about 5,000;
n' is less than m;

and R¹ and X are present in relative heterogeneous order.

4. The composition of claim 3 wherein said film former is a water-soluble polymer represented by the formula $$R^3O-(R^1O)_m-R^4$$

wherein, R¹ represents —CH₂—CH₂—.

5. The composition of claim 3 wherein said aminosilane is selected from the group consisting of beta-aminomethyltrimethoxysilane; gamma-aminopropyltrimethoxysilane; gamma-methylaminopropyltrimethoxysilane; gamma-ethylaminopropyltrimethoxysilane; gamma-aminopropyltriethoxysilane; gamma-aminopropyltripropoxysilane; gamma-aminopropylmethyldiethoxysilane; gamma-aminopropylethyldiethoxysilane; N-beta-aminoethylgamma-aminopropyltrimethoxysilane; N-beta-aminoethyl-gamma-aminopropyltriethoxysilane; gamma-aminopropylphenyldiethoxysilane; gamma-aminoisobutyltrimethoxysilane; N-(2-aminoethyl)-N'-[3-(triethoxysilyl)propyl]-1,2-ethanediamine; N-(2-aminoethyl)-N'-[3-(trimethoxysilyl)propyl]-1,2-ethanediamine; delta-aminobutyltriethoxysilane; delta-aminobutylmethyldiethoxysilane; and beta-aminoethyltriethoxysilane; and said film former is selected from the group consisting of poly(ethylene oxide); water-soluble polypropylene glycols; polyoxyethylene monooleyl ether; polyoxyethylene monostearyl ether; polyoxyethylene monolauryl ether; polyoxyethylene monononylphenyl ether; polyoxyethylene distearyl ether; and, polyoxyethylene dinonylphenyl ether.

6. The composition of claim 2 wherein said vinyl chloride resin is a homopolymer of vinyl chloride containing about 57% by wt chlorine, or a chlorinated poly(vinyl chloride) containing from about 58% to about 72% by weight chlorine.

7. The composition of claim 6 wherein said aminosilane is present in an amount in the range from 0.2% to 0.6% by wt based on 100 parts of pristine glass fibers; and, said film former is present in an amount in the range from 0.2% to 0.6% by wt.

8. The composition of claim 7 wherein said poly(vinyl chloride) has an inherent viscosity in the range from about 0.53 to about 1.1.

9. In a process for pelletizing vinyl chloride homopolymer and glass fibers, the improvement comprising,
   (a) heating said homopolymer in which the vinyl chloride portion of each repeating unit contains about 57% to about 72% by wt chlorine with a stabilizer to a temperature above about 160° C. but below a temperature at which said resin is degraded,
   (b) kneading said hot homopolymer to form a uniform mass with from about 5% to about 50% by wt of glass fibers based on the weight of glass and homopolymer, each fiber having a diameter less than about 20 microns, wherein said glass fibers are coated with a size consisting essentially of
      (i) an amino silane coupling agent having a reactive amine moiety which upon reaction with said resin results in a compound having a peak in a proton magnetic resonance spectra at 5.65 ppm, and
      (ii) a film former consisting essentially of a polymer having a ring-opened lower alkylene oxide containing from about 2 to about 4 carbon atoms as an essential component in a repeating unit optionally containing another copolymerizable component, and,
   (c) comminuting the mass to form pellets in the size range from about 3 mm to about 8 mm in equivalent diameter.

10. A shaped article formed from a composite of a vinyl chloride resin in which the vinyl chloride portion of each repeating unit contains from about 57% to about 72% by wt chlorine, reinforced with glass fibers and containing a stabilizer, in which composite said resin is present in an amount in the range from about 50 percent to about 95 percent by weight (% by wt) based on the combined weight of glass fibers and resin in the composite, and the glass fibers are present in an amount in the range from about 5% to about 50% by wt and have a diameter less than about 20 microns, and are coated with a size consisting essentially of
   (i) an amino silane coupling agent having a reactive amine moiety which upon reaction with said resin results in a compound having a peak in a proton magnetic resonance spectra at 5.65 ppm, and
   (ii) a film former consisting essentially of a polymer having a ring-opened lower alkylene oxide containing from about 2 to about 4 carbon atoms as an essential component in a repeating unit optionally containing another copolymerizable component, whereby the tensile strength of said composite is at least double that of the homopolymer without said glass fibers.

11. The article of claim 10 wherein said vinyl chloride resin is present in an amount in the range from about 50% to about 95% by wt; and, said glass fibers are present in an amount in the range from about 5% to about 50% by wt based on the combined weight of glass fibers and vinyl chloride resin, and have a diameter in the range from about 10 microns to about 16 microns.

12. The article of claim 11 wherein said amino silane coupling agent is represented by the formula $$H_2NR^1-(R^1NH)_n-Si(R^2O)_3$$

wherein,
R¹ represents an alkylene group having from 2 to about 5 carbon atoms,
n represents an integer in the range from 0 to 3, and
R² represents alkyl having from 1 to about 6 carbon atoms; and, said film former is a solvent-soluble polymer represented by the formula $$R^3O-(R^1O)_m-(X)_{n'}-m'-R^4$$

wherein,
X is the residue of a monomer selected from the group consisting of epichlorohydrin, tetrahydrofuran, beta-propiolactone, styrene oxide and maleic anhydride, and an alkylene glycol having from 1 to about 12 carbon atoms;
R³ and R⁴ independently represent a hydrogen atom or a hydrocarbon group having from 3 to 30 carbon atoms;
n' is an integer in the range from 0 to about 100;
m is an average number of recurring units which is in the range from about 5 to about 200,000;
m' is an average number of recurring units which is in the range from 1 to about 5,000;

$n'$ is less than $m$;

and $R^1$ and X are present in relative heterogeneous order.

13. The article of claim 12 wherein said vinyl chloride resin is a homopolymer of vinyl chloride containing about 57% by wt chlorine, or a chlorinated poly(vinyl chloride) containing from about 58% to about 72% by weight chlorine.

14. The article of claim 13 wherein said film former is a water-soluble polymer represented by the formula $$R^3O-(R^1O)_m-R^4$$

wherein, $R^1$ represents $-CH_2-CH_2-$.

15. The article of claim 14 wherein said aminosilane is present in an amount in the range from 0.2% to 0.6% by wt based on 100 parts of pristine glass fibers; and, said film former is present in an amount in the range from 0.2% to 0.6% by wt.

16. The article of claim 15 wherein said poly(vinyl chloride) has an inherent viscosity in the range from about 0.53 to about 1.1.

17. The shaped article of claim 16 wherein failure of said composite is in cohesive failure.

18. The article of claim 17 wherein the tensile wet strength is equal to or greater than the dry strength of an identical composite with no film former in the sizing.

* * * * *